United States Patent [19]

DeGuia

[11] 4,370,438

[45] Jan. 25, 1983

[54] POLYESTER BLEND COMPOSITIONS EXHIBITING SUPPRESSION OF TRANSESTERIFICATION

[75] Inventor: Andrea A. DeGuia, North Plainfield, N.J.

[73] Assignee: Celanese Corporation, New York, N.Y.

[21] Appl. No.: 252,563

[22] Filed: Apr. 9, 1981

[51] Int. Cl.³ .............................................. C08L 67/02
[52] U.S. Cl. ................................... 524/412; 524/411; 524/451; 524/513; 524/605
[58] Field of Search ....................... 260/40 R; 525/444; 524/411, 412, 451, 513, 605

[56] References Cited

U.S. PATENT DOCUMENTS

| | | |
|---|---|---|
| 3,740,245 | 6/1973 | White et al. ........................ 106/306 |
| 3,953,394 | 4/1976 | Fox et al. ........................... 260/40 R |
| 3,962,174 | 6/1976 | Berardinelli ....................... 260/40 R |
| 4,271,064 | 6/1981 | Dieck ................................ 260/40 R |
| 4,284,550 | 8/1981 | Mizuno et al. .................... 260/40 R |

Primary Examiner—Lewis T. Jacobs
Attorney, Agent, or Firm—Burns, Doane, Swecker & Mathis

[57] ABSTRACT

The present invention provides a non-burning, non-dripping polyester blend composition in which transesterification is suppressed, as indicated by, e.g., improved heat deflection temperature. The composition comprises (a) approximately 35 to 85 percent by weight of a blend of polyethylene terephthalate and polybutylene terephthalate wherein the polyethylene terephthalate comprises approximately 10 to 25 percent by weight of the blend; (b) approximately 5 to 60 percent by weight of a reinforcing agent; (c) approximately 4 to 15 percent by weight of at least one halogen-containing organic flame retardant compound; and (d) approximately 2 to 10 percent by weight of the amorphous non-abrasive reaction product of antimony trioxide, or a compound of antimony which generates antimony trioxide, and a substrate comprising a hydrous compound of silicon in a weight ratio within the range of approximately 1:1 to 1:4, on an antimony trioxide:substrate basis. The composition may further comprise approximately 0.1 to 8 percent by weight of a thermoplastic phenoxy resin and/or approximately 0.5 to 2.5 percent by weight of a polytetrafluoroethylene resin. The amorphous non-abrasive reaction product is preferably the reaction product of antimony trioxide and talc, preferably in a 25:75 or 45:55 weight ratio. A process for suppressing transesterification in glass reinforced, non-burning, non-dripping polyester blend compositions is also disclosed.

29 Claims, No Drawings

POLYESTER BLEND COMPOSITIONS EXHIBITING SUPPRESSION OF TRANSESTERIFICATION

BACKGROUND OF THE INVENTION

Blends of polyethylene terephthalate and poly(1,4-butylene terephthalate) are known in the art. See, for example, Fox et al, U.S. Pat. No. 3,953,394, which discloses blended compositions comprising a combination of (a) a poly(ethylene terephthalate) resin and (b) a poly(1,4-butylene terephthalate) resin. The alloyed combination of resins can also include reinforcing agents and flame retardants.

A common problem with flame-retarded blends of polyethylene terephthalate and polybutylene terephthalate is the transesterification reaction between polyethylene terephthalate and polybutylene terephthalate. The transesterification reaction occurs to a great extent when the blend is held for a period of time at processing temperatures in the presence of antimony trioxide ($Sb_2O_3$) flame retardant. As a result of the transesterification reaction promoted by the $Sb_2O_3$, a copolymer is formed which exhibits a lower heat deflection temperature than that of blends of polyethylene terephthalate and polybutylene terephthalate which do not contain $Sb_2O_3$. If transesterification is suppressed, the heat deflection temperatures of non-burning, non-dripping blends of polyethylene terephthalate and polybutylene terephthalate are about the same as those of non-burning, non-dripping polybutylene terephthalate products. Heat deflection temperature can be measured by ASTM procedure D648.

The occurrence of transesterification is also indicated by changes in the melting temperature of the polybutylene terephthalate component of a polyester blend composition. More specifically, transesterification is indicated by a decrease in the temperature corresponding to the endotherm associated with the melting temperature of polybutylene terephthalate, when measured by differential scanning calorimetry (DSC). The effect on the melting temperature of the PET component is not a reliable indicator of the occurrence of transesterification.

A decrease in the melt crystallization temperature of a PET/PBT blend composition can also be indicative of transesterification. However, this effect can be due to other factors, such as the presence of nucleating agents, etc.

It has now been found that the transesterification reaction and the disadvantageous results thereof in non-burning, non-dripping blends of polyethylene terephthalate and polybutylene terephthalate are substantially reduced or eliminated by the inclusion of a particular flame retardant which may be substituted for or used in combination with the antimony trioxide which is commonly employed as a flame retardant in non-burning, non-dripping blends of polyethylene terephthalate and polybutylene terephthalate.

The particular flame retardant which is employed in the composition of the present invention is the amorphous non-abrasive reaction product of antimony trioxide, or a compound of antimony which generates antimony trioxide, and a substrate comprising a hydrous compound of silicon, as disclosed in white et al, U.S. Pat. No. 3,740,245. White et al discloses reacting a trivalent compound of antimony with a substrate comprising a hydrous compound of silicon at a weight ratio of approximately 1:1 to 1:4 on an antimony trioxide:substrate basis at a critical temperature in the range of from 400° C. to 500° C. in an oxygen containing atmosphere. The reaction product is a particulate solid which is non-abrasive and which is useful as a flame retardant additive in plastics, such as polyvinyl chloride, epoxy resin, polyesters, rubber, and the like. The patent does not disclose the effectiveness of the product in suppressing transesterification in blends of polyethylene terephthalate and polybutylene terephthalate.

A similar disclosure is found in the article "Novel Antimony Based Flame Retardants," by Hans Hansen, Robert Hunter, and Joseph Schwarcz, Pigments and Chemicals Division, NL Industries, Inc. (Highstown, New Jersey). The article further discloses that the antimony product discussed therein is more active than antimony trioxide and, when the product is used as a flame retardant, a 50% reduction in antimony concentration is possible as result of using antimony in the more active form.

U.S. Pat. No. 4,048,135 discloses thermoplastic linear saturated polyesters containing flameproofing agents. The flameproofing agents consist of halogen compounds and a supported antimony compound which is prepared by precipitating antimony trioxide from an aqueous suspension onto an inorganic support. It is disclosed that the use of antimony trioxide is known to have a degrading effect on linear polyesters and that the use of antimony trioxide obtained in the disclosed manner requires at most half the amount of antimony trioxide required in conventional systems. The preferred linear saturated polyester is polybutylene terephthalate. Again, there is no disclosure of the use of an antimony trioxide/talc reaction product to suppress transesterification in blends of polyethylene terephthalate and polybutylene terephthalate.

U.S. Pat. No. 4,111,892 discloses a reinforced fire retardant polytetramethylene terephthalate resin composition having improved electrical characteristics. The polytetramethylene terephthalate resin may be a mixture of at least 60% by weight of a polytetramethylene terephthalate and up to 40% by weight of at least one other polymer, such as polyethylene terephthalate. The composition further includes a halogen compound and antimony compounds as a fire retardant combination, a combination of hydrated silica and talc in a specified ratio, and talc and glass fibers as reinforcing fillers. Again, there is no disclosure of the inclusion of an antimony trioxide/talc reaction product to suppress transesterification in blends of polyethylene terephthalate and polybutylene terephthalate.

U.S. Pat. No. 4,140,669 discloses a polyester blend composition containing a talc/silica combination which provides improved heat deflection temperature under load in molded articles.

U.S. Pat. No. 3,624,024 and U.S. Pat. No. 3,963,669 disclose polyester resin compositions containing polybutylene terephthalate homopolymers or copolymers, glass fibers, flame retardants, and talc. These patents do not relate to blends of polybutylene terephthalate and polyethylene terephthalate.

U.S. Pat. No. 4,035,333 relates to a flame resistant resin composition having improved arc resistance comprising polytetramethylene terephthalate, a flame retardant halogen compound, sodium antimonate or a sodium antimonate-antimony trioxide mixture, and, optionally, talc.

U.S. Pat. No. 3,671,487 discloses the inclusion of polytetrafluoroethylene resin in a normally flammable linear polyester in order to control dripping. U.S. Pat. No. 3,962,174 discloses the inclusion of a thermoplastic phenoxy resin in polybutylene terephthalate or polypropylene terephthalate polymers or copolymers.

It can be seen from the review of the prior art provided above that there has been no disclosure of the inclusion of the reaction product of talc and antimony trioxide or an antimony trioxide generating compound in blends of polyethylene terephthalate and polybutylene terephthalate in order to suppress transesterification.

Therefore, it is an object of the present invention to provide a non-burning, non-dripping polyester blend composition in which transesterification is at least partially suppressed.

It is also an object of the present invention to provide a non-burning, non-dripping polyester blend composition which includes the amorphous non-abrasive reaction product of antimony trioxide or a compound of antimony which generates antimony trioxide and a substrate comprising a hydrous compound of silicon, the composition exhibiting suppression of transesterification, and therefore also improved heat deflection temperature over conventional non-burning, non-dripping polyester blend compositions.

It is also an object of the present invention to provide a low-cost, non-burning, non-dripping polyester blend composition which exhibits a heat deflection temperature comparable to that of polybutylene terephthalate compositions, due to at least partial suppression of transesterification.

It is also an object of the present invention to provide a method for suppressing transesterification, and thereby improving heat deflection temperature, in non-burning, non-dripping polyester blend compositions by at least partially replacing a conventional synergistic flame retardant consisting essentially of antimony trioxide with the amorphous non-abrasive reaction product of antimony trioxide or a compound of antimony which generates antimony trioxide and a substrate comprising a hydrous compound of silicon.

These and other objects, as well as the scope, nature, and utilization of the present invention, will be apparent to those skilled in the art from the following detailed description.

SUMMARY OF THE INVENTION

In one aspect, the present invention provides a non-burning, non-dripping polyester blend composition in which transesterification is suppressed. The composition comprises (a) approximately 35 to 85% by weight of a blend of polyethylene terephthalate and polybutylene terephthalate wherein the polyethylene terephthalate comprises approximately 10 to 25% by weight of the blend; (b) approximately 5 to 60% by weight of a reinforcing agent; (c) approximately 4 to 15% by weight of at least one halogen-containing organic flame retardant compound; and (d) approximately 4 to 10% by weight of the amorphous non-abrasive reaction product of antimony trioxide or a compound of antimony which generates antimony trioxide and a substrate comprising a hydrous compound of silicon in a weight ratio within the range of approximately 1:1 to 1:4, on an antimony:-substrate basis.

In another aspect, the present invention provides a process for suppressing transesterification in a glass reinforced, non-burning, non-dripping polyester blend composition which comprises (a) approximately 35 to 85% by weight of a blend of polyethylene terephthalate and polybutylene terephthalate wherein the polyethylene terephthalate comprises approximately 10 to 25% by weight of the blend; (b) approximately 5 to 60% by weight of a reinforcing agent comprising fibrous glass; (c) approximately 4 to 15% by weight of at least one halogen-containing organic flame retardant compound; and (d) approximately 4 to 10% by weight of a synergistic flame retardant consisting essentially of antimony trioxide. The process comprises replacing at least 50% of the synergistic flame retardant consisting essentially of antimony trioxide with the amorphous, non-abrasive reaction product of antimony trioxide or a compound of antimony which generates antimony trioxide and a substrate comprising a hydrous compound of silicon in a weight ratio within the range of approximately 1:1 to 1:4, on an antimony trioxide:substrate basis.

DETAILED DESCRIPTION OF THE INVENTION

The present invention relates to a non-burning, non-dripping polyester blend composition in which transesterification is suppressed. As used herein, the term "non-burning, non-dripping" is used to describe compositions which meet the standards of ASTM test method D-635 and Underwriter's Laboratories Bulletin Number 94.

The polyester blend employed in the composition of the present invention is a blend of polyethylene terephthalate and polybutylene terephthalate. High molecular weight linear thermoplastic polyesters, such as polyethylene terephthalate and polybutylene terephthalate, are well known as film and fiber formers, and they are provided by methods outlined in Whinfield et al, U.S. Pat. No. 2,465,319, and Pengilly, U.S. Pat. No. 3,047,539, and elsewhere. Blends of polyethylene terephthalate and polybutylene terephthlate are disclosed in Fox et al, U.S. Pat. No. 3,953,394, which is herein incorporated by reference in its entirety. The method of blending the linear polyesters is not critical and can be carried out by conventional techniques. One convenient method comprises blending the polyesters in powder or granular form, extruding the blend, and comminuting the blended polymer into pellets or other suitable shapes. Preferably, the polyethylene terephthalate comprises approximately 10 to 25% by weight of the blend.

The blend of polyethylene terephthlate and polybutylene terephthalate comprises approximately 35 to 85% by weight of the total composition. In an especially preferred embodiment, the blend of polyethylene terephthalate and polybutylene terephthalate is present in the composition in a concentration within the range of approximately 50 to 60% by weight.

The composition of the present invention further comprises a reinforcing amount of a reinforcing agent. In general, any reinforcement can be used, e.g., fibers, whiskers or platelets of metals (e.g., aluminum, iron, nickel, and the like) and non-metals (e.g., ceramics, carbon filaments, silicates, asbestos, $TiO_2$, titanate whiskers, quartz, glass flakes and fibers, and the like). It is to be understood that, unless the reinforcing agent adds to the strength, stiffness, and impact strength of the composition, it is only a filler and not a reinforcing agent as contemplated herein.

Preferably, the reinforcing agent comprises a fibrous reinforcing agent, and in particularly preferred embodiments comprises fibrous glass. The length of the glass filaments is not critical to the present invention. It also is not critical whether the fibrous glass is utilized in the form of filaments, fibers, yarns, ropes, rovings, mats, etc. In preparing the present compositions, it is convenient to use the filamentous glass in the form of chopped strands of from about ⅛ inch to about 1 inch long, preferably less than ¼ inch long. In articles molded from the compositions, on the other hand, even shorter lengths will be encountered because, during compounding, considerable fragmentation will occur. Because it has been found that certain commonly used flammable sizings on the glass, e.g., dextrinized starch on synthetic polymers, contribute flammability often in greater proportion than expected from the amount present, it is preferred to use lightly sized or unsized glass reinforcements in the compositions of the present invention, which are flame retardant. Sizings, if present, can readily be removed by heat cleaning or other techniques well known to those skilled in the art.

Although it is only necessary to have at least a reinforcing amount of the reinforcing agent present, the reinforcing agent commonly will comprise about 1 to 60% by weight of the total composition. Preferably, the reinforcing agent is present in a concentration within the range of approximately 10 to 40% by weight (e.g., approximately 30% by weight).

The composition of the present invention also includes a halogen-containing organic flame retardant compound.

Among the useful halogen-containing compounds are those of the formula

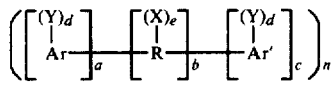

wherein n is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether, carbonyl, and carbonate; a sulfur-containing linkage (e.g., sulfide, sulfoxide, sulfone); a phosphorus-containing linkage; and the like. R can also consist of two or more alkylene or alkylidene linkages connected by such groups as aromatic radical, ether, ester, carbonyl, sulfide, sulfoxide, sulfone, a phosphorus-containing linkage, and the like. R can be a dihydric phenol (e.g., bisphenol-A) carbonate linkage. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic, or organometallic radicals. The substituents represented by Y include (1) halogen, e.g., chlorine, bromine, iodine, or fluorine, (2) ether groups of the general formula OE, wherein E is a monovalent hydrocarbon radical similar to X, (3) monovalent hydrocarbon groups of the type represented by R, and (4) other substituents, e.g., nitro, cyano, etc., with such other substituents being essentially inert provided there be at least one and preferably two halogen atoms per aryl (e.g., phenyl) nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise, either a or c, but not both, be 0. When b is 0, the aromatic groups are joined by a direct carbon-to-carbon bond.

The hydroxyl and Y substituents on the aromatic groups Ar and Ar' can be in the ortho, meta, or para positions on the aromatic rings, and the groups can be in any possible geometric relationship with respect to one another.

Included within the scope of the above formula are diaromatics of which the following are representative:
2,2-bis(3,5-dichlorophenyl)propane
bis(2-chlorophenyl)methane
bis(2,6-dibromophenyl)methane
1,1-bis(4-iodophenyl)ethane
1,2-bis(2,6-dichlorophenyl)ethane
1,1-bis(2-chloro-4-iodophenyl)ethane
1,1-bis(2-chloro-4-methylphenyl)ethane
1,1-bis(3,5-dichlorophenyl)ethane
2,2-bis(3-phenyl-4-bromophenyl)ethane
2,3-bis(4,6-dichloronaphthyl)propane
2,2-bis(2,6-dichlorophenyl)pentane
2,2-bis(3,5-dichlorophenyl)hexane
bis(4-chlorophenyl)phenylmethane
bis(3,5-dichlorophenyl)cyclohexylmethane
bis(3-nitro-4-bromophenyl)methane
bis(4-hydroxy-2,6-dichloro-3-methoxyphenyl)methane
2,2-bis(3,5-dichloro-4-hydroxyphenyl)propane
2,2-bis(3-bromo-4-hydroxyphenyl)propane.

The preparation of these and other applicable biphenyls are known in the art. In place of the divalent aliphatic group in the above examples may be substituted sulfide, sulfoxy, and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl, and halogenated diphenyl ethers, containing 2 to 10 halogen atoms, such as decabromodiphenyl ether.

Another class of suitable flame retardants which are not necesarily embraced by the above formula are non-exuding flame retardants. Examples of such flame retardants are halogenated polystyrene (e.g., brominated polystyrene available from Ferro Chem. under the trademark Pyro Chek 68 PB); bis(tetrabromophthalimide)ethane, available as Saytex BT-93 from Saytech, Inc. and polydibromophenylene oxide, available as Velsicol 935 from Velsicol Chem., Inc.

The preferred halogen compounds for this invention are the halogenated diphenyl ethers. Especially preferred is decabromodiphenyl ether, either alone or in combination with other halogen-containing organic flame retardants.

The amount of flame retardant used is not critical to the invention, as long as it is present in a minor proportion based on the composition (major proportions detract from physical properties). The amount of flame retardants used is at least sufficient to render the composition non-burning. In general, the amount of flame retardant will be from about 4 to 15% by weight, based upon the total weight of the composition (preferably, 4 to 10% by weight). In an especially preferred embodiment, the flame retardant used is about 5% by weight, based upon the total weight of the composition, of decabromodiphenylether.

The composition of the present invention further comprises the amorphous non-abrasive reaction product of antimony trioxide, or a compound of antimony which generates antimony trioxide, and a substrate comprising a hydrous compound of silicon. Such a product is disclosed in U.S. Pat. No. 3,740,245, which is herein incorporated by reference in its entirety. Briefly, the antimony trioxide (or compound of antimony which generates antimony trioxide) and the hydrous compound of silicon are reacted in a weight ratio of about 1:1 to 1:4, on an antimony trioxide:substrate basis, at a critical temperature within the range of about 400° to 550° C. in an oxygen containing atmosphere. The reaction product is a particulate solid which is non-abrasive and which is compatible with plastics. Further details regarding the product and the process of making the same may be found in the above-identified patent.

For the purposes of the present invention, the product referred to immediately above preferably comprises the reaction product of antimony trioxide and talc. In an especially preferred embodiment, the product comprises the reaction product of approximately 25% by weight of antimony trioxide and approximately 75% by weight of talc. This product is now available commercially under the trademark Oncor 75 RA from Anzon America, Inc. In another especially preferred embodiment, the product comprises the reaction product of approximately 45% by weight of antimony trioxide and approximately 55% by weight of talc. This product is now available commercially under the trademark Oncor 55 from Anzon America, Inc.

The product described above is employed in the composition of the present invention in an amount sufficient to provide the well known synergistic flame retardant effect due to the interaction of the antimony trioxide and the halogen-containing organic flame retardant. Preferably, the amorphous non-abrasive reaction product is employed in a concentration within the range of approximately 2 to 10% by weight, based upon the total weight of the composition.

In the composition of the present invention, the amorphous reaction product described above may be utilized in admixture with antimony trioxide. When such a mixture is utilized, the amorphous reaction product comprises at least 50% by weight of the mixture, and the mixture comprises approximately 4 to 10% by weight (e.g., approximately 5% by weight) of the polyester blend composition.

Commonly, the reaction product, or mixture of reaction product and antimony trioxide, is employed in a concentration substantially equal to that of the halogen-containing organic flame retardant. In a preferred embodiment, the reaction product, or the aforementioned mixture, is employed in a concentration of approximately 5% by weight, based upon the total weight of the composition.

Optionally, the composition of the present invention may further comprise a thermoplastic phenoxy resin. The phenoxy resins which are useful in the composition of the present invention are described in U.S. Pat. No. 3,962,174, which is herein incorporated by reference in its entirety. Briefly, the phenoxy resin utilized herein can be characterized by the repeating structure

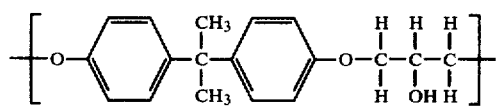

The phenoxy resins have an average molecular weight of about 15,000 to 75,000. Further details regarding the phenoxy resins and their method of preparation may be found in the above-identified patent. When present, the phenoxy resins are included in the composition of the present invention in an amount within the range of approximately 0.1 to 8 % by weight. Preferably, the phenoxy resin is present in a concentration of approximately 0 to 3% by weight (e.g., approximately 0.5 to 3% by weight).

The composition of the present invention optionally may also include a polytetrafluoroethylene resin in order to further retard dripping of flaming resin. The polytetrafluoroethylene resins are commercially available or can be prepared by known processes. They are white solids obtained by the radical initiated polymerization of tetrafluoroethylene in aqueous media with free radical catalyst (see, for example, U.S. Pat. No. 2,393,967). Preferred polytetrafluoroethylene resins are available commercially from the DuPont Company under the trademark Teflon.

The polytetrafluoroethylenes utilized in the composition of the present invention are present in an amount at least sufficient to render the composition non-dripping when burning. For example, the polytetrafluoroethylene resins may be present in an amount within the range of approximately 0 to 2.5% by weight (more preferably, within the range of approximately 0.5 to 2.5% by weight).

The method of preparing the composition of the present invention is not critical and can be carried out by conventional techniques. As discussed above, one convenient method for blending a polyester resin comprises blending the resin in powder or granular form, extruding the blend, and comminuting the blend into pellets or other suitable shapes. The reinforcements and other additives can be added in any usual manner, e.g., by dry mixing or by mixing in the melted state in an extruder, a heated mill, or in other mixers.

By way of illustration, glass roving (a bundle of strands of filaments) can be chopped into small pieces, e.g., ⅛ inch to 1 inch in length, preferably less than ¼ inch in length, and put into an extrusion compounder with the polyester resins, the halogen containing organic flame retardant component, the antimony-containing component, and, if used, the polytetrafluoroethylene and/or phenoxy resin to produce molding pellets.

The compositions can be molded in any equipment conventionally used for reinforced thermoplastic compositions. For example, good results are obtained in an injection molding machine with conventional cylinder temperatures and conventional mold temperatures. Depending upon the molding properties of the composition, the amount of reinforcing agent, and the rate of crystallization of the polyester resin blend, those skilled in the art will be able to make the conventional adjustments in molding cycles to accommodate the composition.

It has been found that the composition described above exhibits suppression of transesterification, as indicated by slightly higher heat deflection temperatures than conventional glass reinforced flame retardant polyester blend compositions which contain antimony trioxide. Transesterification is a common problem in polyester blend compositions, and the occurrence of transesterification is often signaled by a slight decrease in heat deflection temperature, by changes in the melting temperatures of the polybutylene terephthalate and polyethylene terephthlate components of a polyester blend composition, and by changes in the melt crystallization temperature of the composition, as discussed previously. It is known that the presence of antimony, e.g., in the form of an antimony trioxide synergistic flame retardant agent, promotes transesterification. Thus, it was unexpected that the present composition which also employs antimony trioxide, although in a different physical form from that employed in conventional polyester blend compositions, would exhibit suppression of transesterification.

In comparisons of compositions containing physical blends of antimony and talc with compositions containing a mixture of the amorphous non-abrasive reaction product and antimony trioxide, it was found that the advantageous properties exhibited by the compositions containing the reaction product were not attributable merely to reduced levels of antimony trioxide. While not wishing to be bound by theoretical considerations, it appears that the presence of talc or other hydrous compound of silicon in the reaction product, together with the reinforcing agent (e.g., fibrous glass), helps to restrict the mobility of polymer molecules, and this effect of the reaction product, coupled with the better dispersed and more reactive form of antimony trioxide, aids in the suppression of transesterification.

Therefore, in another aspect of the present invention, a process for suppressing transesterification in a glass reinforced, non-burning, non-dripping polyester blend composition is provided. The compositions to which the process is applicable comprise (a) approximately 35 to 85% by weight of a blend of polyethylene terephthalate and polubutylene terephthalate wherein the polyethylene terephthalate comprises approximately 10 to 25% by weight of the blend; (b) approximately 5 to 60% by weight of a reinforcing agent comprising fibrous glass; (c) approximately 4 to 15% by weight of at least one halogen-containing organic flame retardant compound; and (d) approximately 4 to 10% by weight of a synergistic flame retardant consisting essentially of antimony trioxide. The compositions which are useful in the process of the present invention may further comprise phenoxy resin and/or polytetrafluoroethylene resin as discussed above. The process comprises replacing at least 50% of the synergistic flame retardant consisting essentially of antimony trioxide with the amorphous non-abrasive reaction product of antimony trioxide, or a compound of antimony which generates antimony trioxide, and a substrate comprising a hydrous compound of silicon in a weight ratio within the range of approximately 1:1 to 1:4 on an antimony trioxide:substrate basis. Preferably, the synergistic flame retardant consisting essentially of antimony trioxide is substantially completely replaced with a substantially equal amount, in terms of weight percent, of the amorphous non-abrasive reaction product.

The following Examples are presented as specific illustrations of the claimed invention. It should be understood, however, that the invention is not limited to the specific details set forth in the Examples.

EXAMPLE 1

Two polyester blend compositions (designated Composition A and Composition B) were prepared. The weight percentages of the various components which were included in Compositions A and B are given in Table I.

TABLE I

| Component | Composition A (Wt. %) | Composition B (Wt. %) |
| --- | --- | --- |
| PBT | 42.0 | 42.0 |
| PET | 14.0 | 14.0 |
| Fiber Glass | 31.0 | 31.0 |
| DBDPE* | 6.0 | 6.0 |
| $Sb_2O_3$ | — | 5.5 |
| Oncor 75 RA | 5.5 | — |
| Phenoxy Resin | 1.0 | 1.0 |
| PTFE Resin | 0.5 | 0.5 |

*Decabromodiphenylether

It can be seen that the compositions basically comprise a 75:25 blend of PBT:PET, fibrous glass reinforcement, decabromodiphenylether as a flame retardant, a phenoxy resin, and a polytetrafluoroethylene resin. In addition, Composition A includes 5.5 weight percent of Oncor 75 RA, which is the reaction product of 25 weight percent antimony trioxide and 75 weight percent talc and is now available commercially from Anzon America, Inc., whereas Composition B includes an equal amount of antimony trioxide. The decabromodiphenylether which was used in the compositions was obtained from Great Lakes Chemical Corp. under the trademark DE-83; the phenoxy resin which was used in the compositions was obtained from Union Carbide as Phenoxy PKHH; and the polytetrafluoroethylene resin was obtained from DuPont under the trademark Teflon K. The remaining components are widely available from a number of commercial sources.

The compositions were prepared by weighing the various components, placing the weighed components into a drum, and tumble blending the components at room temperature. Thereafter, the blended composition was melt extruded at approximately 250° C. into cool running water and the extruded material was chopped into pellets.

As an indication of the degree of transesterification, the PBT melting temperature, PET melting temperature, and melt crystallization temperature of samples of Compositions A and B were measured by differential scanning calorimetry (DSC), as shown in Table II.

TABLE II

| | Compsition A | | | Composition B | | |
| --- | --- | --- | --- | --- | --- | --- |
| Run No. | Tm PBT (°C.) | Tm PET (°C.) | Tcm (°C.) | Tm PBT (°C.) | Tm PET (°C.) | Tcm (°C.) |
| 1 | 217 | 249 | 170 | 218 | 243 | 166 |
| 2 | 217 | 256 | 165 | 217 | 249 | 165 |
| 3 | 216 | 256 | 164 | 214 | * | 158 |
| 4 | 216 | 257 | 163 | 208 | * | 154 |

TABLE II-continued

| | Compsition A | | | Composition B | | |
|---|---|---|---|---|---|---|
| Run No. | Tm PBT (°C.) | Tm PET (°C.) | Tcm (°C.) | Tm PBT (°C.) | Tm PET (°C.) | Tcm (°C.) |
| 5 | 217 | 258 | 160 | 198 | * | 152 |

*No DSC peak was observed.

In each run, the samples were extruded at approximately 250° C. through a Monsanto rheometer. In Run No. 1, the samples were extruded without being held at the elevated temperature for any appreciable length of time. In Run No. 2, the samples were held at the elevated temperature for five minutes; in Run No. 3, the samples were held at the elevated temperature for 10 minutes; in Run No. 4, the samples were held at the elevated temperature for 15 minutes; and in Run No. 5, the samples were held at the elevated temperature for 20 minutes.

As discussed previously, the occurrence of transesterification in PET/PBT blends is commonly indicated by a decrease in the PBT melting temperature. In the absence of transesterification, the melting temperature of PBT is ordinarily approximately 225° C. Thus, it can be seen that in the samples of Compositions A and B utilized in Run No. 1, having PBT Tm of 217° C. and 218° C., respectively, transesterification occurred to a certain extent. Further transesterification was effectively suppressed in the samples of Composition A, which included the reaction product of antimony trioxide and talc, when held at the elevated temperature for periods of time ranging from 5 to 20 minutes, as indicated by the fact that the PBT Tm remained in the vicinity of 217° C. In contrast, the PBT Tm of the samples of Composition B, which included antimony trioxide, decreased from 218° C. to 198° C. when held at the elevated temperature for periods of time up to 20 minutes, thereby indicating the occurrence of further transesterification.

Any change in the PET Tm is recognized as not being an effective indicator of transesterification.

The occurrence of transesterification is also indicated by a decrease in the melt crystallization temperature of polymer compositions. It can be seen from Table II that samples of the composition containing the reaction product of antimony trioxide and talc exhibit higher melt crystallization temperature and less decrease in melt crystallization temperature when held at elevated temperature for a period of time than do the samples which contain antimony trioxide alone. However, this effect may also be due in part to a nucleating effect caused by the presence of talc in the samples of Composition A.

EXAMPLE 2

Polymer blend Compositions C, D, and E were prepared in the manner described in Example 1. The weight percentages of the components included in each composition as well as the heat deflection temperature of each composition, together with the corresponding data for Composition A, are given in Table III. The corresponding data for Composition X, which includes no PET, are included for comparative purposes.

TABLE III

| | Composition | | | | |
|---|---|---|---|---|---|
| Component | A (wt. %) | C (wt. %) | D (wt. %) | E (wt. %) | X (wt. %) |
| PBT | 42.0 | 47.6 | 42.0 | 47.6 | 55.5 |
| PET | 14.0 | 8.4 | 14.0 | 8.4 | — |
| Fiber Glass | 31.0 | 31.0 | 31.0 | 31.0 | 31.0 |
| DBDPE | 6.0 | 6.0 | 6.0 | 6.0 | 5.5 |
| Sb$_2$O$_3$ | — | — | 2.5 | 2.5 | 5.5 |
| Oncor 75 RA | 5.5 | 5.5 | 3.0 | 3.0 | — |
| Phenoxy | 1.0 | 1.0 | 1.0 | 1.0 | 2.0 |
| Teflon K | 0.5 | 0.5 | 0.5 | 0.5 | 0.5 |
| HDT (°C.) | 204 | 203 | 191 | 195 | 204 |

As discussed previously, a slight decrease in the heat deflection temperature of articles molded from PET/PBT blend compositions is an indication of the occurrence of transesterification. It can be seen from the data of Table III that Compositions A and C, which contain the reaction product of antimony trioxide and talc (Oncor 75 RA), exhibit heat deflection temperatures which are virtually identical to that of composition X, which is an analogous PBT homopolymer composition. In contrast, those compositions which include free antimony trioxide in combination with Oncor 75 RA (Compositions D and E) exhibit significantly lower heat deflection temperatures. Therefore, it can be seen that the substitution of Oncor 75 RA for free antimony trioxide significantly suppresses transesterification in polyester blend compositions. All of the compositions listed in Table III are non-burning (V-O rating), non-dripping compositions.

EXAMPLE III

Polymer blend compositions F, G, and H were prepared in the manner described in Example I. The weight percentages of the components included in each composition and the heat deflection temperatures of the compositions are given in Table IV.

TABLE IV

| | Composition | | |
|---|---|---|---|
| Component | F (Wt. %) | G (Wt. %) | H (Wt. %) |
| PBT | 41.6 | 41.6 | 41.6 |
| PET | 13.9 | 13.9 | 13.9 |
| Fiber Glass | 31.0 | 31.0 | 31.0 |
| DBDPE | 5.5 | 5.5 | 5.5 |
| Oncor 75 RA | 5.5 | 3.0 | — |
| Sb$_2$O$_3$ | — | 2.5 | 1.4 |
| Talc | — | — | 4.1 |
| Phenoxy | 2.0 | 2.0 | 2.0 |
| Teflon K | 0.5 | 0.5 | 0.5 |
| HDT (°C.) | — | 202 | 197 |
| Flammability | V-O,ND | V-O,ND | V-O,ND |

Each of Compositions F, G, and H is a 25/75 PET/PBT blend composition. As the synergistic flame retardant agent, Composition F contains the reaction product of 25 weight percent antimony trioxide and 75 weight percent talc (Oncor 75 RA). Composition G contains an equal amount, in terms of weight percent, of a synergistic flame retardant agent comprising 45% free antimony trioxide and 55% Oncor 75 RA. Composition H includes a physical blend of 25 weight percent free antimony trioxide and 75 weight percent talc.

While the heat deflection temperature of Composition F was not actually determined, it would be expected to be approximately the same as that of Composition A (i.e., approximately 204° C.).

A comparison of the data for Compositions G and H indicates that Composition G, which contains a *greater* amount of antimony trioxide than does Composition H, exhibits a *higher* heat deflection temperature. This indicates that transesterification is suppressed in Composition G as compared to Composition H.

A comparison of the data for Compositions F and H indicates that the inclusion of the reaction product of antimony trioxide and talc (Oncor 75 RA) provides a composition for which the heat deflection temperature is expected to be much higher than that exhibited by the composition which includes equal amounts of antimony trioxide and talc physically blended. Therefore, it can be seen that Oncor 75 RA is much more effective in the suppression of transesterification in non-burning, non-dripping polyester compositions than is a physical blend of talc and antimony trioxide.

Although the invention has been described with preferred embodiments, it is to be understood that variations and modifications may be employed as will be apparent to those of ordinary skill in the art. Such variations and modifications are to be considered within the purview and scope of the claims appended hereto.

I claim:

1. A non-burning, non-dripping polyester blend composition exhibiting suppression of transesterification, said composition comprising:
   (a) approximately 35 to 85% by weight of a blend of polyethylene terephthalate and polybutylene terephthalate wherein the polyethylene terephthalate comprises approximately 10 to 25% by weight of the blend;
   (b) approximately 5 to 60% by weight of a reinforcing agent;
   (c) approximately 4 to 15% by weight of at least one halogen containing organic flame retardant compound; and
   (d) approximately 2 to 10% by weight of the amorphous non-abrasive reaction product of antimony trioxide or a compound of antimony which generates antimony trioxide and a substrate comprising a hydrous compound of silicon in a weight ratio within the range of approximately 1:1 to 1:4, on an antimony trioxide:substrate basis.

2. The polyester blend composition of claim 1 wherein said blend of polyethylene terephthalate and polybutylene terephthalate is present in said composition in a concentration within the range of approximately 50 to 60% by weight.

3. The polyester blend composition of claim 1 wherein said reinforcing agent comprises a fibrous reinforcing agent.

4. The polyester blend composition of claim 3 wherein said reinforcing agent comprises fibrous glass.

5. The polyester blend composition of claim 1 wherein said reinforcing agent is present in a concentration within the range of approximately 10 to 40% by weight.

6. The polyester blend composition of claim 5 wherein said reinforcing agent is present in a concentration of approximately 30% by weight.

7. The polyester blend composition of claim 1 wherein said halogenated organic flame retardant component comprises decabromodiphenyl ether.

8. The polyester blend composition of claim 1 wherein said halogenated organic flame retardant component is present in a concentration of approximately 4 to 10% by weight.

9. The polyester blend composition of claim 1 wherein said halogenated organic flame retardant component is present in a concentration of approximately 5% by weight.

10. The polyester blend composition of claim 1 wherein said compound of antimony of component (d) comprises antimony trioxide and wherein said substrate comprises talc.

11. The polyester blend composition of claim 10 wherein component (d) comprises the reaction product of approximately 25% by weight antimony trioxide and approximately 75% by weight talc.

12. The polyester blend composition of claim 10 wherein component (d) comprises the reaction product of approximately 45% by weight antimony trioxide and approximately 55% by weight talc.

13. The polyester blend composition of claim 1 wherein component (d) is present in a concentration of approximately 5% by weight.

14. The polyester blend composition of claim 1 which further comprises approximately 0.1 to 8% by weight of a thermoplastic phenoxy resin having the repeating structure

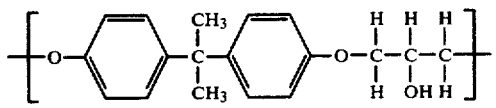

and an average molecular weight range of about 15,000 to 75,000.

15. The polyester blend composition of claim 14 wherein said phenoxy resin is present in a concentration of approximately 0.5 to 3% by weight.

16. The polyester blend composition of claim 1 which further comprises approximately 0.5 to 2.5% by weight of a polytetrafluoroethylene resin.

17. A non-burning, non-dripping polyester blend composition exhibiting suppression of transesterification, said composition comprising:
   (a) approximately 50 to 60% by weight of a blend of polyethylene terephthalate and polybutylene terephthalate wherein the polyethylene terephthalate comprises approximately 10 to 25% by weight of the blend;
   (b) approximately 30% by weight of a reinforcing agent comprising fibrous glass;
   (c) approximately 5% by weight of at least one halogen-containing organic flame retardant compound comprising decabromodiphenyl ether;
   (d) approximately 5% by weight of the amorphous non-abrasive reaction product of antimony trioxide and a substrate comprising talc in a weight ratio within the range of approximately 1:1 to 1:4, on an antimony trioxide:substrate basis;
   (e) approximately 0.5 to 3% by weight of a thermoplastic phenoxy resin having the repeating structure

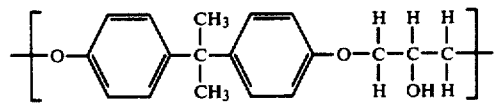

and an average molecular weight of about 15,000 to 75,000; and (f) approximately 0.5 to 2.5% by weight of a polytetrafluoroethylene resin.

18. The polyester blend composition of claim 17 wherein component (d) comprises the reaction product of approximately 25% by weight antimony trioxide and approximately 75% by weight talc.

19. The polyester blend composition of claim 17 wherein component (d) comprises the reaction product of approximately 45% by weight antimony trioxide and approximately 55% by weight talc.

20. A process for suppressing transesterification in a glass reinforced, non-burning, non-dripping polyester blend composition which comprises:
(a) approximately 35 to 85% by weight of a blend of polyethylene terephthalate and polybutylene terephthalate wherein the polyethylene terephthalate comprises approximately 10 to 25% by weight of the blend;
(b) approximately 5 to 60% by weight of a reinforcing agent comprising fibrous glass;
(c) approximately 4 to 15% by weight of at least one halogen-containing organic flame retardant compound; and
(d) approximately 4 to 10% by weight of a synergistic flame retardant consisting essentially of antimony trioxide;

said process comprising replacing at least 50% of said synergistic flame retardant consisting essentially of antimony trioxide with the amorphous non-abrasive reaction product of antimony trioxide or a compound of antimony which generates antimony trioxide and a substrate comprising a hydrous compound of silicon in a weight ratio within the range of approximately 1:1 to 1:4, on an antimony trioxide:substrate basis.

21. The process of claim 20 wherein said polyester blend composition further comprises approximately 0.1 to 8% by weight of a thermoplastic phenoxy resin having the repeating structure

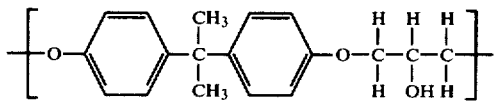

and an average molecular weight range of about 15,000 to 75,000.

22. The process of claim 20 wherein said polyester blend composition further comprises approximately 0.5 to 2.5 percent by weight of a polytetrafluoroethylene resin.

23. The process of claim 20 wherein said synergistic flame retardant consisting essentially of antimony trioxide is substantially completely replaced with a substantially equal amount, in terms of weight percent, of said amorphous non-abrasive reaction product.

24. The process of claim 20 wherein said amorphous non-abrasive reaction product comprises the reaction product of antimony trioxide and talc.

25. The process of claim 24 wherein said amorphous non-abrasive reaction product comprises the reaction product of approximately 25% by weight antimony trioxide and approximately 75% by weight talc.

26. The process of claim 24 wherein said amorphous non-abrasive reaction product comprises the reaction product of approximately 45% by weight antimony trioxide and approximately 55% by weight talc.

27. A process for suppressing transesterification in a glass reinforced, non-burning, non-dripping polyester blend composition which comprises
(a) approximately 50 to 60% by weight of a blend of polyethylene terephthalate and polybutylene terephthalate wherein the polyethylene terephthalate comprises approximately 10 to 25% by weight of the blend;
(b) approximately 30% by weight of a reinforcing agent comprising fibrous glass;
(c) approximately 5% by weight of at least one halogen-containing organic flame retardant compound comprising decabromodiphenyl ether;
(d) approximately 5% by weight of a synergistic flame retardant consisting essentially of antimony trioxide;
(e) approximately 0.5 to 3% by weight of a thermoplastic phenoxy resin having the repeating structure

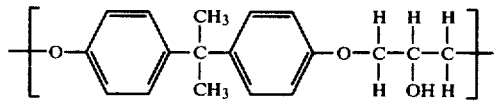

and an average molecular weight of about 15,000 to 75,000; and
(f) approximately 0.5 to 2.5% by weight of a polytetrafluoroethylene resin, said process comprising substantially completely replacing said synergistic flame retardant consisting essentially of antimony trioxide with a substantially equal amount, in terms of weight percent, of the amorphous non-abrasive reaction product of antimony trioxide and a substrate comprising talc in a weight ratio within the range of approximately 1:1 to 1:4, on an antimony trioxide:substrate basis.

28. The process of claim 27 wherein said amorphous non-abrasive reaction product comprises the reaction product of approximately 25% by weight antimony trioxide and approximately 75% by weight talc.

29. The process of claim 27 wherein said amorphous non-abrasive reaction product comprises the reaction product of approximately 45% by weight antimony trioxide and approximately 55% by weight talc.

* * * * *